United States Patent [19]

Shroff et al.

[11] Patent Number: 5,459,201
[45] Date of Patent: Oct. 17, 1995

[54] IMPACT STRENGTH, STRESS-WHITENING AND BRUISE-RESISTANCE FOR IMPACT MODIFIED POLYPROPYLENE

[75] Inventors: Ramesh N. Shroff; Chun D. Lee, both of Cincinnati, Ohio

[73] Assignee: Quantum Chemical Corporation, Cincinnati, Ohio

[21] Appl. No.: 212,754

[22] Filed: Mar. 11, 1994

[51] Int. Cl.$^6$ .............................. C08L 23/26; C08L 23/12; C08L 23/16
[52] U.S. Cl. .............................. 525/197; 525/198; 525/240
[58] Field of Search .................................... 525/240, 198, 525/197

[56] References Cited

U.S. PATENT DOCUMENTS

| | | |
|---|---|---|
| Re. 30,405 | 9/1980 | Fischer. |
| Re. 31,518 | 2/1984 | Fischer. |
| Re. 32,028 | 11/1985 | Fischer. |
| 3,240,727 | 3/1966 | Scalari, et al.. |
| 3,456,038 | 7/1969 | Newmann, et al.. |
| 3,758,643 | 9/1973 | Fischer. |
| 3,806,558 | 4/1974 | Fischer. |
| 3,862,106 | 1/1975 | Fischer. |
| 3,970,722 | 7/1976 | Ogihara, et al.. |
| 4,087,485 | 5/1978 | Huff. |
| 4,087,486 | 5/1978 | Fielding, et al.. |
| 4,105,718 | 8/1978 | Weemes, et al.. |
| 4,140,732 | 2/1979 | Schnetger, et al.. |
| 4,143,099 | 3/1979 | Duncan. |
| 4,368,280 | 1/1983 | Yui, et al.. |
| 4,454,092 | 6/1984 | Shimizu, et al.. |
| 4,489,034 | 12/1984 | Davidson. |
| 4,678,834 | 7/1987 | Boivin, et al.. |
| 4,829,125 | 5/1989 | Yeo, et al.. |

FOREIGN PATENT DOCUMENTS

| | | |
|---|---|---|
| 55-24410 | 6/1980 | Japan. |

*Primary Examiner*—Joseph L. Schofer
*Assistant Examiner*—I. Zemel
*Attorney, Agent, or Firm*—Gerald A. Baracka; William A. Heidrich

[57] ABSTRACT

The present invention relates to a process for preparing high melt flow rate thermoplastic compositions that have improved impact and bruise-resistance properties and to the thermoplastic composition that are produced by the process of the instant invention. Specifically, the process comprises the steps of precontacting a non-crosslinked elastomeric polymeric component with a peroxide compound at a temperature below the decomposition temperature of the peroxide and below the melting point of the non-crosslinked polymeric component to produce a peroxide adsorbed polymeric component; and melt mixing the aforementioned peroxide adsorbed polymeric component with a high propylene content polymeric component selected from the group consisting of homopolymers of propylene, block copolymers of propylene and ethylene, and thermoplastic olefin polymers at a temperature above the decomposition temperature of the peroxide.

36 Claims, 2 Drawing Sheets

IMPACT STRENGTH, STRESS-WHITENING AND BRUISE-RESISTANCE FOR IMPACT MODIFIED POLYPROPYLENE

FIELD OF THE INVENTION

The present invention is directed to a process for preparing thermoplastic compositions that have improved injection molding properties. More specifically, the compositions of the instant invention exhibit a pronounced viscosity upturn at frequencies of less than about 1.0 rad/sec in their melt rheological data.

The present invention also relates to the thermoplastic compositions that are produced by the process of the instant invention. Such compositions produced by the inventive method exhibit superior impact strength and decreased stress-whitening compared with prior art compositions. Thus, the combination of those properties makes the thermoplastic compositions of the instant invention especially suitable for use in injection molding applications.

BACKGROUND OF THE INVENTION

Injection molding of conventional rubber is carried out by blending additives with the rubber, kneading the blend and curing it after injection into a mold. Such a process entails such disadvantages as the necessity of using a special molding machine, long cycle times and the need to carry out a number of complicated processing steps. Similar disadvantages occur in extrusion molding, and these disadvantages have made it impossible to carry out smooth production of rubber products. Thus, it has been suggested that rubber be replaced with materials which can be processed without curing, but that have properties similar to those of rubber.

This suggestion has been put to practice with materials having rubber-like properties. Among the materials which have been used are soft plastics such as soft vinyl chloride resins, ethylene-vinyl acetate copolymers, and low density polyethylenes. Although these materials have good processability and high flexibility, they suffer such drawbacks as low heat-resistance and low rebound elasticity which severely limits their use.

In order to improve the heat-resistance and mechanical strength of soft plastics, soft plastics have been blended with a plastic of a high melting point polymer such as high density polyethylene or polypropylene. This blending, however, does not result in a good product because it causes a loss of flexibility, and further, when a thick product is molded from the blended material sinkmarks are apt to occur. Moreover, the prior art blends exhibit stress-whitening when subjected to an impact. Recently, attention has being given to "thermoplastic elastomers", a group of materials that have properties which fall between those of cured rubbers and soft plastics.

Olefinic thermoplastic elastomers are already known. For example, U.S. Pat. No. 4,087,486 to Fielding et al. provides a thermoplastic composition that comprises from 5 to 30 parts by weight of a saturated ethylene-propylene rubber, 95 to 70 parts by weight of a crystalline propylene homopolymer, and from 0.01 to 0.2 parts by weight of an organic peroxide per each 100 parts by weight of the total concentration of saturated ethylene-propylene rubber and polypropylene. These compositions, which are said to have improved knit-line properties, are prepared by first blending the aforementioned components and then adding the blend to an extruder.

U.S. Pat. No. 4,140,732 to Schnetger et al. provides another thermoplastic rubber composition which purportedly exhibits improved tensile strength, elongation and tear propagation resistance values. The thermoplastic compositions disclosed in Schnetger et al. comprise mixtures of either partially crosslinked ethylene-propylene or ethylene-propylene-diene sequential polymers and a polyolefin resin containing olefinic monomers such as ethylene, propylene, 1-butene and the likes thereof. The partial crosslinking occurs either during or after the mixing of the sequential polymers and the polyolefin resins.

Another thermoplastic composition that can be used for injection molding applications is disclosed in U.S. Pat. No. 4,829,125 to Yeo et al. The thermoplastic compositions disclosed in Yeo et al. are prepared by first blending an olefin copolymer rubber and a crystalline polypropylene polymer in a ratio of 1:1.01–0.5 to prepare a preblend and then melt blending 10–75 parts by weight of the preblend and 90–25 parts by weight of the crystalline polypropylene polymer in the presence of an organic peroxide in an extruder.

U.S. Pat. Nos. 3,758,643 (now reissued as U.S. Pat. No. Re 30,405) and 3,862,106 to Fisher et al. also describe thermoplastic blends that can be used as molded or extruded articles. Specifically, the thermoplastic blends disclosed in these Fisher et al. patents comprise a partially crosslinked rubbery copolymer of ethylene and at least one other copolymerizable monoolefin of the formula $CH_2=CHR$ where R is an alkyl radical having from 1 to 12 carbon atoms and an non-crosslinked resinous polyolefin such as polypropylene wherein the weight ratio of the rubbery copolymer to uncrosslinked resinous polyolefin is from 10:90 to 90:10. The partial crosslinking of the rubbery copolymer occurs prior to blending with the non-crosslinked resinous component by the action of a curative to obtain a rubbery copolymer having a gel content of at least 30 percent but less than 90 percent by weight.

Despite the current state of the art, none of the references noted hereinabove disclose a process for preparing high flow rate thermoplastic compositions, which exhibit reduced stress-whitening and improved impact strength, by melt mixing above the decomposition temperature of a peroxide, a mixture comprising a high propylene content polymeric component and a non-crosslinked elastomeric component which has been intimately precontacted with a peroxide at a temperature below the melting point of the polymer.

In contrast to the method disclosed in the present invention, all of the above-identified references require that the polymers or the polymer blends be partially or fully visbroken. The term "visbroken" as used in the prior art means heating a polymer or mixture of polymers to effect degradation via thermal cracking to produce a product having segments of lower molecular weight, evidenced by a greater flow rate. Consequently, the thermoplastic compositions described in the prior art do not exhibit the unexpected viscosity upturn in their dynamic melt rheological data at frequencies of less than about 1.0 rad/sec which is exhibited by the compositions of the instant invention.

SUMMARY OF THE INVENTION

The present invention is directed to a process for preparing thermoplastic compositions that exhibit reduced stress-whitening and improved bruise resistance. Specifically, the instant invention relates to a process for preparing high melt flow rate thermoplastic polymeric compositions by melt mixing above the decomposition temperature of the peroxide, a mixture comprising a high propylene content polymeric component and a non-crosslinked elastomeric component which has been previously intimately contacted, i.e. precontacted, with a peroxide compound below the decomposition temperature of the peroxide and the melting point of the elastomeric component.

The high propylene content polymeric component employed in the instant invention is a propylene polymer or copolymer selected from the group consisting of homopolymers of propylene, block copolymers of propylene and ethylene and thermoplastic olefin polymers (TPO's). The non-crosslinked elastomeric component is an elastomer selected from the group consisting of ethylene-propylene rubber, ethylene-propylene-diene terpolymer rubber, styrene-butadiene copolymer rubber, isoprene rubber, butadiene rubber, butadiene-acrylonitrile copolymer rubber and butadiene-isobutylene copolymer rubber.

The term "intimately precontacted" is used herein to denote that the peroxide is only being physically adsorbed onto the surface of the elastomeric component. Hence, no apparent crosslinking of the elastomeric component occurs in this stage. Instead, it is believed that the physically adsorbed peroxide improves the compatibility of the elastomeric component for the high propylene content component.

The present invention also relates to the thermoplastic compositions that are produced from the aforementioned process. The thermoplastic compositions of the invention have a characteristic upturn in their dynamic melt rheological properties compared with prior art compositions that are visbroken. Specifically, the thermoplastic compositions of the present invention exhibit an unexpected upturn of their dynamic complex viscosity, $\eta^*$, and dynamic storage modulus, $G'$, values. Furthermore, the compositions of the instant invention produced by the aforementioned process have reduced stress-whitening and improved bruise resistance compared to prior art compositions.

The thermoplastic compositions of the instant invention having the above-identified properties are suitable for use in the manufacturing of various articles such as battery cases, automobile instrument panels, and other large items. Moreover, the compositions of the instant invention are especially useful in the field of injection molding.

DETAILED DESCRIPTION OF THE DRAWINGS

DETAILED DESCRIPTION OF THE INVENTION

Figure 1:
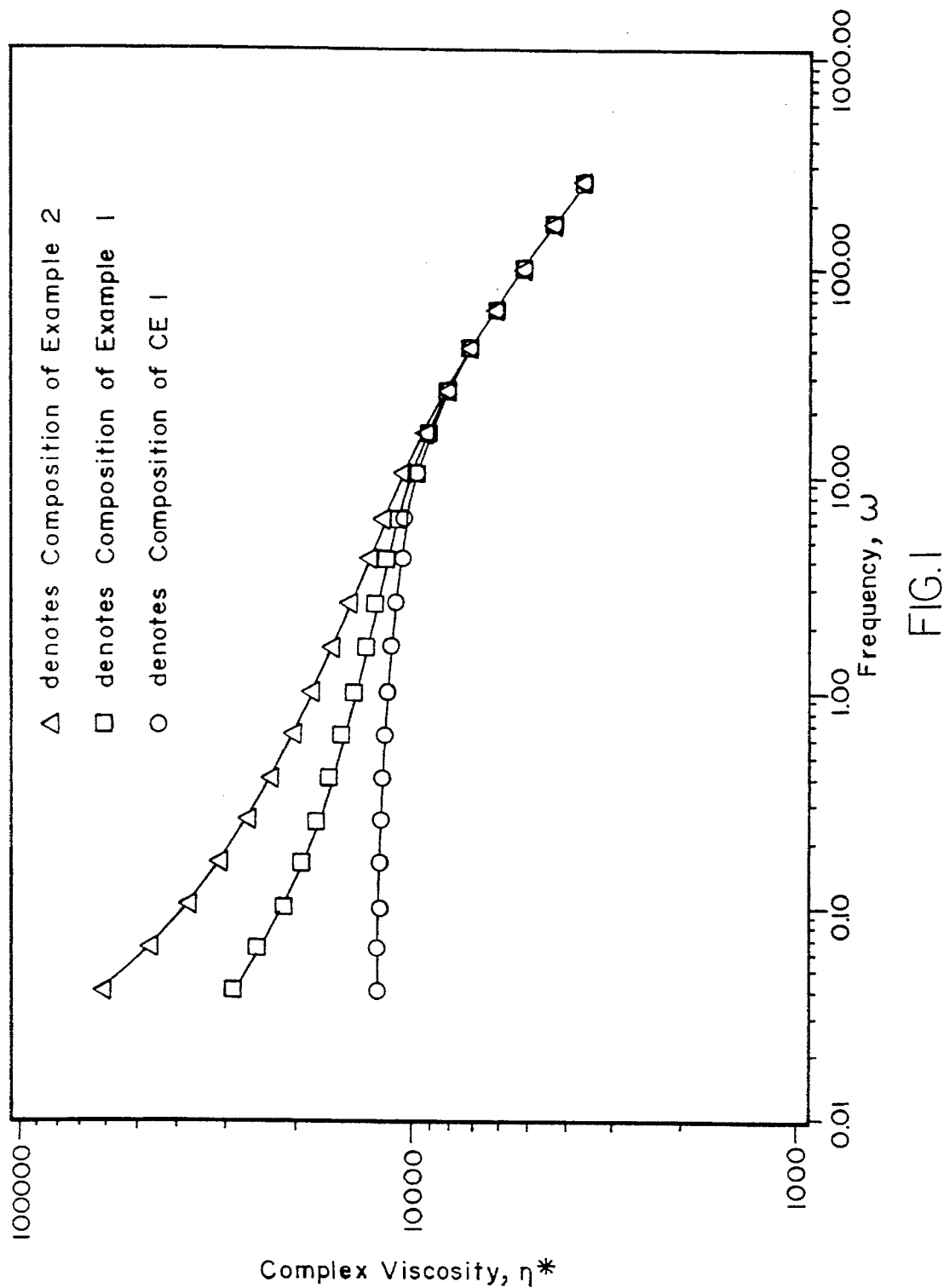
FIG. 1 represents a graph of the dynamic complex viscosity, $\eta^*$, vs the frequency, $\omega$, of the thermoplastic compositions of Examples 1 and 2 and Comparative Example 1.

In accordance with the present invention there is provided a process for preparing high melt flow rate thermoplastic polymeric compositions that have improved bruise resistance and which do not exhibit any appreciable stress-whitening when a external force is exerted thereon. Specifically, the process of the instant invention comprising the steps of (a) precontacting a non-crosslinked elastomeric component with a peroxide compound at a temperature below the decomposition temperature of the peroxide and below the melting point of the non-crosslinked elastomeric component to produce a peroxide adsorbed elastomeric component; and (b) melt mixing the peroxide adsorbed elastomeric component of step (a) with a high propylene content polymeric component selected from the group consisting of homopolymers of propylene, block copolymers of propylene and ethylene, and thermoplastic olefin polymers at a temperature above the decomposition temperature of the peroxide.

It should be emphasized herein that the amount of peroxide employed in the present invention is insufficient to effect any appreciable crosslinking of the elastomeric component. However, the amount of peroxide added to the elastomeric component is sufficient to cause free radical formation to occur on the surface of the elastomeric component, thus, improving the compatibility of that component for the high propylene content polymeric component.

The high propylene content polymeric component employed in the instant invention is a propylene polymer or copolymer selected from the group consisting of homopolymers of propylene, block copolymers of propylene and ethylene and thermoplastic olefin polymers. The aforementioned high propylene content polymeric components are produced by processes that are well known in the art. Such processes, for example, are disclosed in U.S. Pat. Nos. 4,579,919, 4,843,132, and 4,857,613, which references are incorporated herein by reference.

The non-crosslinked elastomeric component employed by the present invention is selected from the group consisting of ethylene-propylene copolymer rubber (EPR), ethylene-propylene-diene terpolymer rubber, styrene-butadiene copolymer rubber, isoprene rubber, butadiene rubber, butadiene-acrylonitrile copolymer rubber and butadiene-isobutylene copolymer rubber. It is especially preferred that the non-crosslinked elastomeric component be EPR. These elastomers are produced by conventional methods that are well known in the art. For example, see Encyclopedia of Polymer Science and Engineering, Vol. 6, pg. 522–544, I. I. Kroschwitz, Wiley & Interscience, N.Y., N.Y. (1986).

When EPR is used as the non-crosslinked elastomeric component it is preferred that the ethylene content of the copolymer is greater than 20 wt. %. More preferably, the EPR employed in the instant invention has an ethylene content from about 30 to about 90 wt. %, the remainder being propylene. Most preferably, the ethylene content of the EPR copolymer is in the range from about 40 to about 80 wt. %, the remainder being propylene.

The non-crosslinked elastomeric component employed in the present invention typically has a Mooney Viscosity of greater than 25 at 125° C., as measured by ASTM D 1646. More preferably, the elastomeric components have a Mooney Viscosity from about 25 to about 100 at 125° C. Most preferably, the Mooney Viscosity of the elastomeric components employed in the present invention is from about 30 to about 60 at 125° C.

When an ethylene-propylene-diene terpolymer rubber is employed in the present invention, the diene monomer of the terpolymer may include non-conjugated dienes having up to 5 to 20 carbon atoms such as 1,4-pentadiene, 1,4-and 1,5-hexadiene, 2,5-dimethyl-1,5-hexadiene, and 1,4-octadiene; cyclic dienes such as cyclopentadiene, cyclohexadiene, cyclooctadiene, and dicyclopentadiene; and alkylene norbornenes such as 5-ethylidene- and 5-butylidene-2-norbornene, and 2-methally- and 2-isopropyl-5-norbornene. Of these dienes, it is particularly preferred that the diene monomer be 1,4-pentadiene.

In accordance with the present invention, the terpolymer that is employed in the instant invention contains from about 30 to about 90 wt. % of ethylene, from about 70 to about 5 wt. % of propylene, with the remainder being the diene monomer. In a preferred embodiment, the terpolymer contains from about 40 to about 80 wt. % ethylene, from about 60 to about 15 wt. % propylene, with the remainder being the diene monomer.

The peroxides employed in the instant invention are any of the commonly employed peroxides that are utilized in the prior art to initiate polymerization. More specifically, it is preferred to utilize peroxides which produce free radicals, the decomposition which is negligible below 120° C., and the half-life of which is high, generally greater than 1 minute at 160° C. Suitable peroxides which encompass the foregoing mentioned properties are, for example, di-(t-butyl) peroxide, dicumyl peroxide, 2,5-dimethyl-2,5-di(t-butylperoxy)-hexane, 2,5-dimethyl-2,5-di(t-butylperoxy)-hexyne-3, butyl-4,4-bis-(t-butylperoxyvalerate), cumyl hydroperoxide, 1,1-bis-(t-butylperoxy)-3,3,5-timethylcyclohexane, 1,3-di-(t-butylperoxy)di-isopropylbenzene, benzoyl peroxide, t-butyl hydroperoxide, t-butyl peroxybenzoate, cumene hydroperoxide, lauroyl peroxide, t-butyl peroxy acetate, t-butyl peroxide methyl ethyl ketone peroxide, t-butyl cumyl peroxide and (t-butylperoxy)-butyrate. The preferred peroxide employed in the instant invention is 2,5-dimethyl-2,5-di-(t-butylperoxy)-hexyne-3.

The quantity of peroxide utilized in the precontacting step of the instant invention is such that the peroxide will only be physically adsorbed onto the surface of the non-crosslinked elastomeric component. In other words the quantity of peroxide employed in the present invention does not initiate any significant amount of crosslinking of the non-crosslinked elastomeric component. Instead the amount of the peroxide employed in the precontacting step is sufficient to form free radicals on the surface on the non-crosslinked elastomeric component, thereby improving the compatibility of that component for the high propylene content polymeric component.

Typically, up to 1500 ppm of a peroxide compound can be employed in the present invention depending on the type of elastomeric component employed in the instant invention. More preferably, the quantity of peroxide employed in the present invention ranges from about 100 to about 1000 ppm, and most preferably, the quantity of peroxide employed ranges from about 300 to about 900 ppm. If the compositions of the instant invention contain more than about 1500 ppm of peroxide, undesirable crosslinking of the elastomeric component will occur.

In the process of the instant invention, the non-crosslinked elastomeric component is intimately precontacted with a peroxide at a temperature well below the decomposition temperature of the peroxide and the melting point of the elastomeric component. It is once again emphasized that such precontacting does not initiate crosslinking of the elastomeric component. Rather, its function is to improve the ability of the elastomeric component to be blended with the high propylene content polymeric component.

More particularly, the aforementioned elastomeric component is precontacted with a peroxide compound at a temperature of about 20° to about 70° C. for a period of time from about 1 to about 10 minutes in a Henschel type mixer. More preferably, the peroxide precontacting step occurs at a temperature of about 35° to about 60° C. for a period of time from about 2 to about 6 minutes. Most preferably, the peroxide precontacting step occurs at a temperature of about 50° C. for a period of time from about 4 minutes.

After the peroxide precontacting step, the peroxide adsorbed non-crosslinked elastomeric component is then melt-mixed with a high propylene content component in a conventional mixer or extruder at a temperature from about 170° to about 300° C. More preferably, melt-mixing occurs at a temperature from about 190° to about 250° C. Most preferably, melt-mixing occurs at a temperature of about 210° to about 240° C.

It is noted that polymeric components and the peroxide compound are precontacted or melt-mixed by any conventional method; but preferably they are precontacted or melt-mixed in an extruder. One or more extruders can be employed in the instant invention depending on the desired composition. In a preferred embodiment, a twin-screw extruder is employed.

The compositions of the instant invention comprise from about 5 to about 40 wt. % of the peroxide adsorbed elastomeric component and from about 95 to about 60 wt. % of the high propylene content polymeric component. More preferably, the compositions comprise from about 10 to about 30 wt. % of the peroxide adsorbed elastomeric component and from about 90 to about 70 wt. % of the high propylene content polymeric component. Most preferably, the compositions of the instant invention comprise from about 20 wt. % of the peroxide adsorbed elastomeric component and about 80 wt. % of the high propylene content polymeric component.

The high melt flow rate thermoplastic polymeric compositions of the instant invention are further characterized as having a melt flow rate at 230° C. and a 2160 gram load, as measured by ASTM D 1238–86, of about 10 to about 100 g/10 min. More preferably, the compositions produced by the present invention have a melt flow rate of about 15 to about 80 g/10 min.

The present invention further relates to the thermoplastic compositions that are produced from the process of the instant invention. Such compositions of the instant invention exhibit superior melt strength compared with prior art compositions that are produced by visbreaking an elastomeric compound or a polymeric blend. Moreover, the thermoplastic compositions of the instant invention exhibit a pronounced upturn in their dynamic melt rheological data at frequencies of less than about 1.0 rad/sec. By upturn, it is meant that dynamic complex viscosity increases with decreasing frequencies at frequencies of less than about 1.0 rad/sec. In contrast, compositions that are produced from prior art processes generally exhibit a limiting constant value at frequencies of less than about 1.0 rad/sec, i.e., the slope of the dynamic viscosity vs. frequency data approaches zero in that range. This viscosity upturn, which is expressed in terms of $G_0^*$, is an indication that the compositions of the instant invention have superior melt strength compared with prior art compositions.

The measurement of viscosity upturn, $G_0^*$, of each composition produced herein was determined from the rheological data using a modified Casson plot of $= \overline{G^*}$ vs. $= \overline{\omega}$ wherein $G^*$ is the absolute value of dynamic modulus and $\omega$ is the frequency. The plot was used to obtain an intercept value $G_0^*$ at $\omega=0$ by the linear extrapolation method.

Typically, the viscosity upturn, $G_0^*$, of the thermoplastic compositions of the instant invention are above 10 dyne/cm$^2$. It is noted herein that a value of $G_0^*$ below 10 dyne/cm$^2$ denotes no viscosity upturn at frequencies of less than about 1.0 rad/sec. More preferably, the compositions of the instant invention have $G_0^*$ values ranging from about 10 to about 4000 dyne/cm$^2$. Most preferably, the $G_0^*$ values of the compositions of the instant invention range from about 50 to about 3000 dyne/cm$^2$.

The compositions of the present invention also exhibit improvement in stress-whitening. That is, the compositions of the present invention show a decrease in stress-whitening. Stress-whitening is a well known phenomenon that is generally believed to be a result of the microcrazes that are formed by high stresses produced via impact of the polymeric surface. The whitening, i.e cloudiness, appears on the surface of a polymeric composition as a white ring around the area of impact.

In general, the tendency of a polymeric composition to exhibit stress-whitening increases as the impact strength of the polymeric compositions increases, See R. Rengararajan et al., J. Appl. Polymeric Sci., Vol. 45, 317–331 (1992). However, the thermoplastic compositions of the instant invention show a decrease in stress-whitening even though the impact strength of the composition increases. Thus, the compositions of the instant invention having the combination of reduced stress-whitening and increased impact strength represent an improvement over prior art compositions.

Moreover, the compositions of the present invention produced by the aforementioned process also exhibit increased bruise resistance compared with prior compositions. The term "bruise resistance" as used herein denotes the ability of a polymeric composition to resist stress-whitening. Hence, a thermoplastic composition that exhibits improved bruise resistance will conversely exhibit a decrease in stress-whitening. More specifically, bruise resistance is a measurement of the differences in the lightness and darkness of a sample and a control sample.

The following test procedures were conducted on each sample:

The rheological properties of each composition produced by the instant invention were determined by using a Rhetometrics Mechanical Spectrometer (RMS). Specifically, a RMS was used to measure the complex viscosities ($\eta^*$) and storage modulus (G') at 190° C. and 210° C. for frequencies ranging from 0.02 to 250 rad/sec of each composition. A cone and plane geometry with a diameter of 25 mm or 50 mm and a cone angle of 0.1 radions was used. The rheological properties of the compositions of the instant invention were determined using standard test procedure ASTM D 4440–84.

Stress-whitening, i.e. bruise resistance, was determined using a Gardner Impact Tester to create whitening while a Hunter Spectrocolorimeter was used to measure the degree of whitening on a test sample. Specifically, stress-whitening was determined by imposing a 4 in-lb impact energy on the Gardner plaque impact specimens using a 2 lb weight with a Gardner Impact Tester. After 4 hours, "L" values using the spectrocolorimeter were measured and recorded. The 4 hr "L" value is then subtracted from a sample which was not tested in the above manner and the stress-whitening was reported in terms of $\Delta$L.

The following examples are given to illustrate the scope of the present invention. Because these examples are given for illustrative purposes only, the invention embodied therein should not be limited thereto.

EXAMPLE 1

A peroxide modified thermoplastic composition was prepared in accordance with the process of the present invention and its dynamic rheological properties were determined.

Specifically, the thermoplastic composition of this example was prepared by intimately precontacting, in a Henschel mixer 20 weight percent of an ethylene-propylene copolymer rubber (EPR) supplied by Exxon Chemical Co. with 350 ppm of 2,5-dimethyl-2,5-di-(t-butylperoxy)-hexyne-3 ("LUPERSOL 130"). The ethylene-propylene copolymer rubber which was supplied by Exxon is referred to as Vistalon 719. Vistalon 719 has an ethylene content of 75 wt. % and a Mooney Viscosity at 125° C. of 54.

To the thus formed peroxide adsorbed elastomeric composition, was added 80 weight percent of a visbroken propylene homopolymer with about 97% isotacticity and an initial MFR of 0.3. The propylene homopolymer was visbroken with 200 ppm of LUPERSOL 130. This mixture was then melt extruded using a 1½" twin-screw extruder with exit melt temperature of 230° C.

The rheological data for this thermoplastic composition is shown in Table I. As shown therein, the thermoplastic composition of this example had a $G_0^*$ value of 160 dyne/cm$^2$ and notched Izod impact values at 23° C. and 5° C. of 0.97 and 0.58, respectively. As mentioned previously hereinabove, a $G_0^*$ value of greater than 10 dyne/cm$^2$ indicates an upturn in the dynamic melt rheological data. This upturn is clearly illustrated in FIG. 1 wherein a tailup, i.e. upturn, in the viscosity profile is observed at frequencies of less than about 1.0 rad/sec.

EXAMPLE 2

A thermoplastic composition was prepared in accordance with the procedure described in Example 1 except that 900 ppm of the peroxide compound was employed in the precontacting step. Furthermore, the propylene polymer was not visbroken prior to its use. The initial MFR value of the propylene polymer was 0.3.

The rheological properties for this thermoplastic composition are shown in Table I. Specifically, the composition had a $G_0^*$ value of 750 and notched Izod impact values at 23° C. and 5° C. of 1.42 and 0.73, respectively. The increased $G_0^*$ value of this composition compared with the $G_0^*$ value of Example 1 indicates that the compatibility of the elastomeric component for the high propylene content polymeric component increases when more peroxide is used in the precontacting step.

As was the case with the composition of Example 1, the composition of this example exhibited an upturn in its rheological melt data. This upturn which is observed at frequencies of less than about 1.0 rad/sec is clearly seen in FIG. 1.

Furthermore the thermoplastic composition of this example had a stress whitening value, $\Delta L^*$, of 4.9.

Comparative Example 1

A thermoplastic composition was prepared by melt mixing 20 wt. % of Vistalon 719 EPR with 80 wt. % of visbroken propylene homopolymer (660 ppm of peroxide). The propylene homopolymer after visbreaking had a MFR value of 25.

The rheological properties of this composition are also shown in Table I. Specifically, the composition of the comparative example had a $G_0^*$ value of zero which indicates no viscosity upturn at frequencies of less than about 1.0 rad/sec. The absence of a viscosity upturn is clearly evident from FIG. 1 wherein the viscosity profile at frequencies of less than about 1.0 rad/sec levels off.

The notched impact values of the composition of this comparative example were determined to be 0.78 and 0.49 at 23° C. and 5° C., respectively. It is noted that the compositions of Examples 1 and 2 have improved Izod impact values compared with the composition of this comparative example.

The stress-whitening value of the composition of this comparative example was determined to be 6.5 which represents an undesirable 24% increase in stress-whitening compared with the composition of Example 2.

EXAMPLE 3

A thermoplastic composition was prepared in accordance with the procedure of Example 1 except that the propylene homopolymer employed in this example had a MFR value of 18 instead of 5.0. Additionally, 250 ppm of the peroxide compound was employed in the precontacting step rather than 350 ppm.

The dynamic melt rheological data for this composition is shown in Table I. As shown therein, the composition of this example had a $G_0^*$ value of 80 dyne/cm$^2$ and notched Izod impact values of 0.51 and 0.38 at 23° C. and 5° C., respectively. As indicated previous herein a $G_0^*$ value of greater than 10 dyne/cm$^2$ represents a viscosity upturn at frequencies of about <1.0 rad/sec. This upturn is clearly seen in FIG. 2.

EXAMPLE 4

A thermoplastic composition was prepared in accordance with the procedure of Example 1 except that the propylene homopolymer had an initial MFR of 5.0. Moreover, this propylene homopolymer was not visbroken prior to its use. Additionally, the EPR was precontacted with 600 ppm of the peroxide compound.

Figure 2:
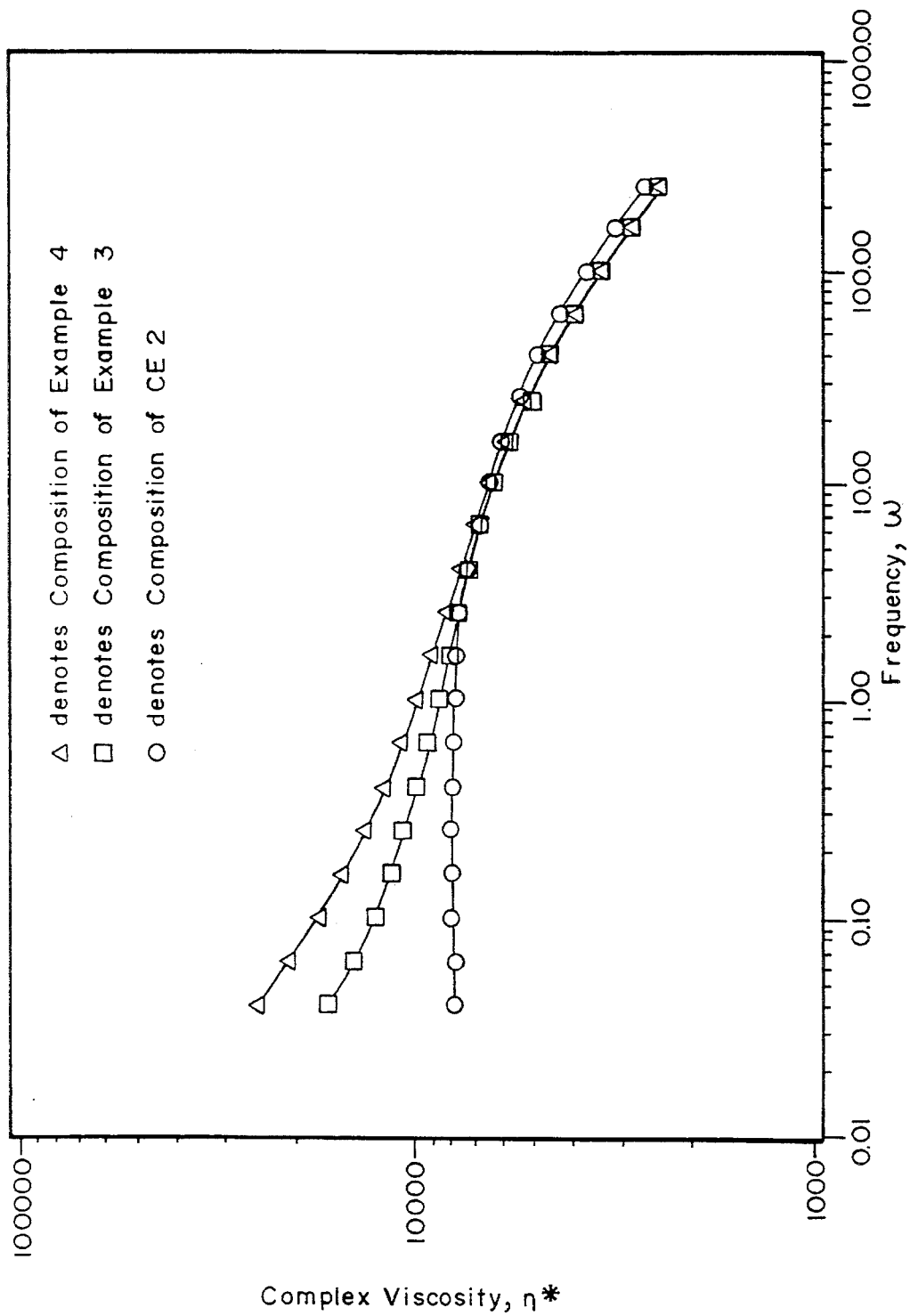
FIG. 2 represents a graph of the dynamic complex viscosity, $\eta^*$, vs. the frequency, $\omega$, of the thermoplastic compositions of Examples 3 and 4 and Comparative Example 2.

The dynamic melt rheological data for this composition is shown in Table I and in FIG. 2. Specifically, the composition of this example had a $G_0^*$ value of 190 dyne/cm$^2$ and notched Izod impact values of 0.59 and 0.40 at 23° C. and 5° C., respectively. This high value of $G_0^*$ indicates that there is a viscosity upturn in the melt rheological data for this composition at frequencies of about <1.0 rad/sec. This phenomenon is clearly shown in FIG. 2. Moreover, the stress-whitening value for this composition was determined to be 6.1.

Comparative Example 2

A thermoplastic composition was prepared in accordance with the procedure of CE1 except that the propylene homopolymer had an initial MFR of 5.0. Moreover, 350 ppm of the peroxide compound was used to visbreak the propylene homopolymer producing a polymeric component having a MFR value of 40.

The dynamic melt rheological data for this comparative example is shown in Table I. The $G_0^*$ value for this composition was zero which indicates no viscosity upturn at frequencies of about <1.0 rad/sec. This is clearly shown in FIG. 2 wherein the dynamic viscosity, η*, levels off at frequencies of about <1.0 rad/sec.

The notched impact values of the composition of this comparative example were determined to be 0.45 and 0.35 at 23° C. and 5° C., respectively. It is noted that the compositions of Examples 3 and 4 have improved Izod impact values compared with the composition of this comparative example.

Furthermore, the composition of this example had a stress-whitening value of 6.9. This value represents an undesirable 12% increase in stress-whitening compared with the composition of Example 4.

EXAMPLE 5

A thermoplastic composition was prepared in accordance with the procedure of Example 1 except that the propylene homopolymer employed in this example had a MFR value of 18 instead of 5.0. This MFR value was obtained by visbreaking the polypropylene polymer with 150 ppm of LUPERSOL 130. Additionally, 400 ppm of the peroxide compound was employed in the precontacting step rather than 350 ppm.

The rheological data for this composition is shown in Table I. As shown therein, the composition of this example had a $G_0^*$ value of 270 dyne/cm$^2$ and notched Izod impact values of 0.52 and 0.40 at 23° C. and 5° C., respectively. As indicated previously herein a $G_0^*$ value of greater than 10 dyne/cm$^2$ represents a viscosity upturn at frequencies of about <1.0 rad/sec.

EXAMPLE 6

A thermoplastic composition was prepared in accordance with the procedure of Example 5 except that the propylene homopolymer was not visbroken prior to its use. Additionally, 800 ppm of the peroxide compound, LUPERSOL 130, was employed in the precontacting step.

The dynamic melt rheological data for this thermoplastic composition is shown in Table I. Specifically, this thermoplastic composition had a $G_0^*$ value of 870 dyne/cm$^2$ and notched Izod impact values of 0.72 and 0.52 at 23° C. and 5° C., respectively. This high value of $G_0^*$ indicates that there is a viscosity upturn in the melt rheological data for this composition at frequencies of about <1.0 rad/sec. The stress-whitening value for this thermoplastic composition was determined to be 5.1.

Comparative Example 3

A thermoplastic composition was prepared in accordance with the procedure of CE 1 except the propylene homopolymer had an initial MFR of 18. Moreover, 500 ppm of the peroxide compound was used to visbreak the propylene homopolymer producing a polymeric component having a MFR value of 62.

The dynamic melt rheological data for this comparative example is shown in Table I. The $G_0^*$ value for this composition was zero which indicates no viscosity upturn at frequencies of about <1.0 rad/sec.

The notched impact values of the composition of this comparative example were determined to be 0.34 and 0.32 at 23° C. and 5° C., respectively. It is once again noted that the compositions of Examples 5 and 6 have improved Izod impact values compared with the composition of this comparative example.

Furthermore, the composition of this comparative example had a stress-whitening value of 7.2. This value represents an undesirable 30% increase in stress-whitening compound with the composition of Example 6.

EXAMPLES 7–9

These examples illustrate the effects of the amount of peroxide that is used in the precontacting step. The specific composition used in this example were prepared by intimately precontacting 20 wt. % of Exxon Vistalon 719 EPR with 500, 900 and 1300 ppm of peroxide.

The adsorbed elastomeric components were then added to 80 wt. % of polypropylene homopolymer and then melt extruded at a temperature of about 230° C.

The dynamic melt rheological data for these compositions is shown in Table II. As shown therein, the $G_0^*$ values increase with increasing amounts of peroxide employed. These results indicate that it is possible to vary the compatibility of the elastomeric component for the high propylene component by varying the amount of peroxide employed in the precontacting step.

EXAMPLES 10–14

These examples illustrate the importance of using an EPR having an ethylene content of greater than about 6% for obtaining thermoplastic compositions that exhibit a viscosity upturn in their melt rheological data. Table III shows various thermoplastic compositions that were produced in accordance with the procedure of the instant invention. In these examples, the amount of peroxide employed in the precontacting step was 900 ppm. As shown in Table III, when the ethylene content of EPR component was about <6.0 no viscosity upturn was observed. This is evident by the zero $G_0^*$ values reported in Table III for compositions that comprises an EPR having an ethylene content of less than about 6.0.

The data in Table III also shows that a markedly pronounced viscosity upturn was obtained by using ethylene-propylene copolymer rubbers that have an ethylene content of about 15.4 to 23.1 wt. %.

EXAMPLES 15–16

The following two examples illustrate the effect of the molecular weight (MW) of EPR on the $G_0^*$ values of thermoplastic compositions. These compositions were prepared in accordance with the procedure described in Example 1 except that in Example 15 the EPR component had a MW, measured in terms of $\eta_0 \times 10^{-5}$, of 24.9 whereas the EPR component used in Example 16 had a MW of 69.4.

The composition of Example 15 had a $G_0^*$ value of 14,630 whereas the $G_0^*$ value for the thermoplastic composition of Example 16 was 27,630. This data indicates that a long linear elastomeric component produces a composition that has a pronounced viscosity upturn at frequencies of less than about 1.0 rad/sec.

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process for preparing a high melt flow rate thermoplastic polymeric composition having improved dynamic melt rheological properties comprising the steps of:

(a) forming a peroxide absorbed composition consisting of a non-crosslinked elastomeric component and a peroxide compound by precontacting said non-crosslinked elastomeric component with said peroxide compound at a temperature below the decomposition temperature of the peroxide and below the melting point of the non-crosslinked elastomeric component; and (b) melt mixing the peroxide absorbed composition of step (a) with a high propylene content polymeric component selected from the group consisting of homopolymers of propylene, block copolymers of propylene and ethylene, and thermoplastic olefin polymers at a temperature above the decomposition temperature of the peroxide.

2. The process according to claim 1 wherein up to 1500 ppm of the peroxide compound is employed in forming the peroxide absorbed composition of step(a).

3. The process according to claim 2 wherein from about 100 to about 1000 ppm of the peroxide compound is employed in forming the peroxide absorbed composition of step (a).

4. The process according to claim 3 wherein from about 300 to about 900 ppm of the peroxide compound is employed in forming the peroxide absorbed composition of

TABLE I

| Sample | MFR of Final Compound (at 230° C.) | $G_o^*$ (dyne/cm$^2$) | Flex Modulus (kpsi) | Notched Izod Impact at 23° C. | Notched Izod Impact at 5° C. | Stress-whitening ΔL* |
|---|---|---|---|---|---|---|
| Example 1 | 19 | 160 | 105.2 | 0.97 | 0.58 | — |
| Example 2 | 19 | 750 | 105.6 | 1.42 | 0.73 | 4.9 |
| C.E. 1 | 20 | 0 | 102.4 | 0.78 | 0.49 | 6.5 |
| Example 3 | 35 | 80 | 137.9 | 0.51 | 0.38 | — |
| Example 4 | 35 | 190 | 144.6 | 0.59 | 0.40 | 6.1 |
| C.E. 2 | 33 | 0 | 137.2 | 0.45 | 0.35 | 6.9 |
| Example 5 | 49 | 270 | 136.8 | 0.52 | 0.40 | — |
| Example 6 | 47 | 870 | 137.7 | 0.72 | 0.52 | 5.1 |
| C.E. 3 | 47 | 0 | 136 | 0.34 | 0.32 | 7.2 |

TABLE II

| Example | Peroxide level (PPM) | $G_o^*$ (dyne/cm$^2$) | Ethylene Content of EPR |
|---|---|---|---|
| 7 | 500 | 670 | 15.4 |
| 8 | 900 | 2130 | 15.4 |
| 9 | 1300 | 3020 | 15.4 |

TABLE III

| Example | Ethylene Content of EPR (wt. %) | $G_o^*$ (dyne/cm$^2$) | Rubber Content (wt. %) |
|---|---|---|---|
| 10 | 5.0 | 0 | 6.5 |
| 11 | 6.0 | 0 | 7.8 |
| 12 | 7.7 | 90 | 10 |
| 13 | 15.4 | 2130 | 20 |
| 14 | 23.1 | 5600 | 30 | step (a).

5. The process according to claim 1 wherein the precontacting step is conducted at a temperature from about 20° to about 70° C. for a period of time from about 1 to about 10 minutes.

6. The process according to claim 5 wherein the precontacting step is conducted at a temperature of about 35° to 60° C. for a period of time from about 2 to about 6 minutes.

7. The process according to claim 1 wherein the elastomeric component is selected from the group consisting of ethylene-propylene rubber, ethylene-propylene-diene terpolymer rubber, styrene-butadiene copolymer rubber, isoprene rubber, butadiene-acrylonitrile copolymer rubber and butadiene-isobutylene rubber.

8. The process according to claim 7 wherein the diene component of the ethylene-propylene-diene terpolymer rubber is a nonconjugated diene containing from 5 to 20 carbon atoms, a cyclic diene or a alkylenyl norbornene.

9. The process according to claim 8 wherein the non-conjugated diene is selected form the group consisting of 1,4-pentadiene, 1,4-hexadiene, 1,5-hexadiene, 2,5-dimethyl-1,5-hexadiene and 1,4-octadiene.

10. The process according to claim 8 wherein the cyclic diene is selected form the group consisting of cyclopentadiene, cyclooctadiene and dicyclopentadiene.

11. The process according to claim 8 wherein the alkylenyl norborene is selected form the group consisting of 5-ethylidene-2-norborene, 5-butyllidene-2-norborene, 2-methyally-5-norborene and 2-isopropenyl-5-norborene.

12. The process according to claim 7 wherein the elastomeric component is an ethylene-propylene rubber.

13. The process according to claim 12 wherein the ethylene constitutes from about 30 to about 90% by weight of the ethylene-propylene rubber with the remainder being propylene.

14. The process according to claim 1 wherein the peroxide is selected from the group consisting of di-(t-butyl) peroxide, dicumyl peroxide, 2,5 dimethyl-2,5-di-(t-butylperoxy)-hexane, 2,5-dimethyl-2,5-di-(t-butylperoxy)-hexyne-3, butyl-4,4-bis-(t-butylperoxyvalerate), cumyl hydroperoxide, 1,1,-bis-(t-butylperoxy) di-isopropylene, benzoyl peroxide, t-butyl hydroperoxide, t-butyl peroxybenzoate, cumene hydroperoxide, lauroyl peroxide, t-butyl peroxy acetate, t-butyl peroxide methyl ethyl ketone peroxide, t-butyl cumyl peroxide and (t-butylperoxy)-butyrate.

15. The process according to claim 14 wherein the peroxide is 2,5-dimethyl-2,5-di-(t-butylperoxy)-hexyne-3.

16. The process according to claim 1 wherein the high propylene content polymeric component is a polypropylene homopolymer.

17. The process according to claim 1 wherein the peroxide adsorbed elastomeric component and the high propylene content polymeric component are melt mixed at a temperature of about 170° to about 300° C.

18. The process according to claim 17 wherein melt mixing occurs at a temperature of about 190° to about 250° C.

19. The process according to claim 18 wherein melt mixing occurs at a temperature of about 210° to about 240° C.

20. The process according to claim 1 wherein the peroxide adsorbed elastomeric component constitutes about 5 to about 40 wt. % of the composition with the remainder being the high propylene content polymeric component.

21. A process according to claim 20 wherein the peroxide adsorbed elastomeric component constitutes about 20 wt. % of the composition with the remainder being the high propylene content polymeric component.

22. A high melt flow rate thermoplastic composition prepared by the steps of:

(a) forming a peroxide absorbed composition consisting of a non-crosslinked elastomeric component and a peroxide compound prepared by precontacting said non-crosslinked elastomeric component with said peroxide compound at a temperature below the decomposition temperature of the peroxide and below the melting point of the non-crosslinked elastomeric component; and (b) melt mixing the peroxide adsorbed composition of step (a) with a high propylene content polymeric component selected from the group consisting of homopolymers of propylene, block copolymers of propylene and ethylene, and thermoplastic olefin polymers at temperature above the decomposition temperature of the peroxide to produce a thermoplastic composition that has $G_0^*$ values ranging from about 10 to about 4000 dyne/cm$^2$.

23. The composition according to claim 22 wherein up to 1500 ppm cf the peroxide compound is employed in forming the peroxide absorbed composition of step (a).

24. The composition according to claim 23 wherein from about 100 to about 1000 ppm of the peroxide compound is employed in forming the peroxide absorbed composition of step (a).

25. The composition according to claim 24 wherein from about 300 to about 900 ppm of the peroxide compound is employed in forming the peroxide absorbed composition of step (a).

26. The composition according to claim 22 wherein the elastomeric component is selected from the group consisting of ethylene-propylene rubber, ethylene-propylene-diene terpolymer rubber, styrene-butadiene copolymer rubber, isoprene rubber, butadiene-acrylonitrile copolymer rubber and butadiene-isobutylene rubber.

27. The composition according to claim 26 wherein the diene component of the ethylene-propylene-diene terpolymer rubber is a nonconjugated diene containing from 5 to 20 carbon atoms, a cyclic diene or a alkylenyl norbornene.

28. The composition according to claim 27 wherein the non-conjugated diene is selected form the group consisting of 1,4-pentadiene, 1,4-hexadiene, 1,5-hexadiene, 2,5-dimethyl-1,5-hexadiene and 1,4-octadiene.

29. The composition according to claim 27 wherein the cyclic diene is selected form the group consisting of cyclopentadiene, cyclooctadiene and dicyclopentadiene.

30. The composition according to claim 27 wherein the alkylenyl norborene is selected form the group consisting of 5-ethylidene-2-norborene, 5-butyllidene-2-norborene, 2-methyally-5-norborene and 2-isopropenyl-5-norborene.

31. The composition according to claim 26 wherein the elastomeric component is an ethylene-propylene rubber.

32. The composition according to claim 31 wherein the ethylene constitutes from about 30 to about 90% by weight of the ethylene-propylene rubber with the remainder being propylene.

33. The composition according to claim 32 wherein the ethylene constitutes from about 40 to about 80% by weight of the ethylene-propylene rubber with the remainder being propylene.

34. The composition according to claim 22 wherein the high propylene content polymeric component is a polypropylene homopolymer.

35. The composition according to claim 22 wherein the peroxide adsorbed elastomeric component constitutes about 5 to about 40 wt. % of the composition with the remainder being the high propylene content polymeric component.

36. The composition according to claim 35 wherein the peroxide adsorbed elastomeric component constitutes about 20 wt. % of the composition with the remainder being the high propylene content polymeric component.

* * * * *